(12) United States Patent
Voth

(10) Patent No.: US 9,339,989 B2
(45) Date of Patent: May 17, 2016

(54) FABRIC FOR INTERCONNECTING TWO SURFACES

(71) Applicant: RAFI GmbH & Co. KG, Berg (DE)

(72) Inventor: Michael Voth, Ravensburg (DE)

(73) Assignee: RAFI GmbH & Co. KG (DE)

( * ) Notice: Subject to any disclaimer, the term of this patent is extended or adjusted under 35 U.S.C. 154(b) by 94 days.

(21) Appl. No.: 14/078,747

(22) Filed: Nov. 13, 2013

(65) Prior Publication Data

US 2014/0134390 A1    May 15, 2014

(30) Foreign Application Priority Data

Nov. 13, 2012  (EP) ..................................... 12192312
Oct. 2, 2013   (EP) ..................................... 13187117

(51) Int. Cl.
| | |
|---|---|
| *B32B 7/06* | (2006.01) |
| *C09J 7/02* | (2006.01) |
| *B32B 5/18* | (2006.01) |
| *G02F 1/1333* | (2006.01) |

(52) U.S. Cl.
CPC ... *B32B 7/06* (2013.01); *B32B 5/18* (2013.01); *C09J 7/0296* (2013.01); *G02F 1/133308* (2013.01); *C09J 2201/128* (2013.01); *C09J 2201/618* (2013.01); *C09J 2203/318* (2013.01); *C09J 2205/302* (2013.01); *C09J 2400/243* (2013.01); *C09J 2423/046* (2013.01); *C09J 2433/00* (2013.01); *C09J 2467/006* (2013.01); *G02F 2001/133314* (2013.01); *G02F 2202/28* (2013.01); *Y10T 428/24008* (2015.01); *Y10T 428/2848* (2015.01)

(58) Field of Classification Search
CPC ............................... A44B 18/0011; B32B 3/28
USPC ........................................................ 428/99, 98
See application file for complete search history.

(56) References Cited

U.S. PATENT DOCUMENTS

| | | | |
|---|---|---|---|
| 6,231,962 B1 * | 5/2001 | Bries et al. .................. | 428/317.3 |
| 2008/0107887 A1 | 5/2008 | Kim | |

FOREIGN PATENT DOCUMENTS

| | | |
|---|---|---|
| DE | 3331016 | 10/1984 |
| WO | WO 98/21285 | 5/1998 |
| WO | WO 99/31193 | 6/1999 |
| WO | WO 99/31407 | 6/1999 |
| WO | WO 2004/054249 | 6/2004 |
| WO | WO 2007/032902 | 3/2007 |
| WO | WO 2008/019994 | 2/2008 |
| WO | WO 2009/151686 | 12/2009 |

* cited by examiner

*Primary Examiner* — Brent O'Hern
(74) *Attorney, Agent, or Firm* — Pandiscio & Pandiscio

(57) ABSTRACT

A fabric for interconnecting two opposite outer sheet layers and comprising two foam layers, each facing one of the opposite outer sheet layers, and an adhesive layer between each foam layer and the corresponding outer layer and a lateral foil, a foil being disposed between the two foam layers, such that the fabric is adapted to be torn apart so as to separate the two opposite layers from each other.

6 Claims, 5 Drawing Sheets

FABRIC FOR INTERCONNECTING TWO SURFACES

BACKGROUND OF THE INVENTION

1. Field of the Invention

The present invention relates to a fabric for connecting and attaching together two opposite surfaces of two components.

2. Description of the Prior Art

Fabrics of this kind are also used as adhesive foil or adhesive strips, and are disclosed, for example, in DE 3 331 016 C2. Such fabrics, adhesive foils, or adhesive strips, are intended to produce a glued connection, by means of which two surfaces of two components running parallel and aligned with one another are connected together in a releasable connection.

However, it has proven to be a disadvantage that such fabrics tear when a tensile force is applied in the longitudinal direction of the fabric. This is because the tensile force reduces the thickness of the fabric, and although the glued connection between the fabric and the particular component is intended to be released, there is the significant risk of the fabric tearing before it is completely removed. Such glued connections are consequently unsuitable for securing high-quality components, for example, connecting a panel to a display, because if the fabric tears when the connection is released, the fabric can no longer be removed and the two components remain firmly fixed together.

Furthermore, it is a disadvantage that the described fabrics can only be released in the longitudinal direction. Particularly in the case of technical products, this freedom of movement is usually blocked by other components or geometries, as a result of which releasing in a required way is not possible.

In particular, during assembly of such high-quality components, it has been shown that disassembly is often required in order to repair or replace individual electrical components that have been damaged during assembly. Normally, as a result, screw connections which can be unfastened are used for connecting panels and displays, or else the adhesive fabric has such a high level of adhesive strength that it can no longer be released without being damaged immediately after it has been applied. However, this results in damage to the component in question, as a result of which such adhesive strips of prior art are unsuitable and impractical for securing high-quality components because they often have to be disposed of if there is damage to individual electrical components that are required in order for the electrical device to function.

It is therefore the object of the present invention to provide a fabric of the aforementioned kind by means of which, firstly, a reliable and durable adhesive connection is produced between two components which can be released over the longest possible period of time, and secondly, is configured in such a way that when the adhesive connection is released, the fabric tears apart in a predefined area in order for the components to be separated from one another. Furthermore, it is the object of the present invention to allow movement for releasing the connection in the direction perpendicular to the adhesive surfaces, in order to ensure that the release function is available in the vicinity of adjacent components or contours.

These objects are accomplished in the present invention.

SUMMARY OF THE INVENTION

Inasmuch as a tear-resistant separating foil is arranged in the fabric, the adhesive layers arranged adjacent to one another will be separated when the fabric is pulled in any direction, preferably in the transverse direction, as a result of which the components to be connected to one another are released from one another initially.

For this purpose, there is provision for the inner connection within the fabric to be destroyed when the fabric is pulled in its transverse direction, whereby there is no longer a mechanical connection between the two components fixed to one another, as a result of which the two components can be separated from one another.

It is particularly advantageous for the layers provided for destruction of the surface connection to be configured in the form of foams such as polyethylene (PE) foam. The selection of the foam material and its density allows, in particular, the force required for releasing to be influenced. Polyurethane (PUR) foams represent other suitable types.

Adhesives with strong adhesive properties are used for the connection in the fabric and with the components. Acrylate is particularly suitable for this. Rubber adhesives are especially advantageous in some applications.

The separating foil is usually manufactured from a polyethylene terephthalate (PET) plastic. However, other foil materials with a high tear resistance, such as PC or PA foils, are also suitable.

BRIEF DESCRIPTION OF THE DRAWINGS

The drawings show one embodiment of a fabric configured in accordance with the present invention, the details of which are explained below. In the drawings.

DESCRIPTION OF THE PREFERRED EMBODIMENTS

Figure 1:
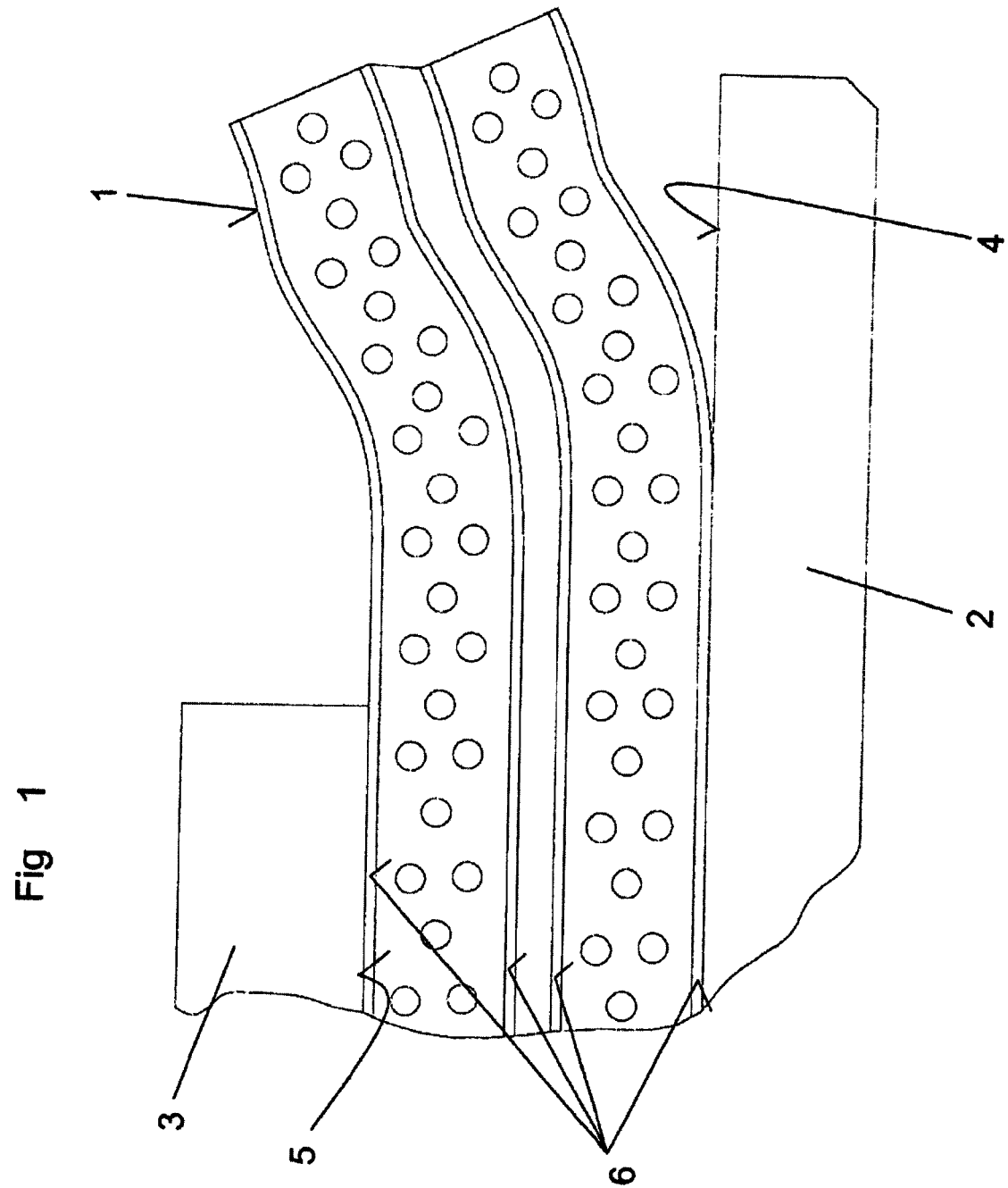
FIG. 1 shows a fabric arranged between two components in order to allow them to be connected together and released, with two foam layers provided for destruction, each of which is provided with an adhesive layer on its surface, in which case the adhesive layer within the fabric is connected to a tear-resistant separating foil, and the adhesive layer on the outside of the fabric is connected to the components which are to be attached.

FIG. 1 shows a fabric 1 by means of which two components 2 and 3 are durably connected together by means of an adhesive connection 6. The components 2 and 3 are of high technical quality and can be configured, in particular, as a panel and display, with further electrical components to be provided in order to establish an electrical device. During assembly of the components 2 and 3, they are initially fixed onto one another by the fabric 1 at the two opposite surfaces 4 and 5, and, after that, additional components, such as circuit boards, sensors, and the like, are installed. During assembly steps such as these, it is possible for damage to occur on the components, leading to the entire structural unit becoming faulty. Consequently, it has been determined that there is a need for the components 2 and 3 to be separable from one another during assembly, in order to replace damaged circuit boards, sensors, and the like. In addition, it may be necessary for components 2 or 3 to have to be replaced during the utilisation period of a device, meaning that they need to be separated from one another.

For this purpose, the fabric 1 has a special structure and configuration, because the fabric 1 chiefly consists of a separating foil 11 arranged between two adhesive layers 12 and foam layers 13 attached to them. Additional adhesive layers 12 connect this structure to the components 2, 3. The adhesive layers 12 can be provided with equal or different adhesive force distribution properties. Such adhesive distributions can be achieved by using different adhesives, for example.

Figure 2:
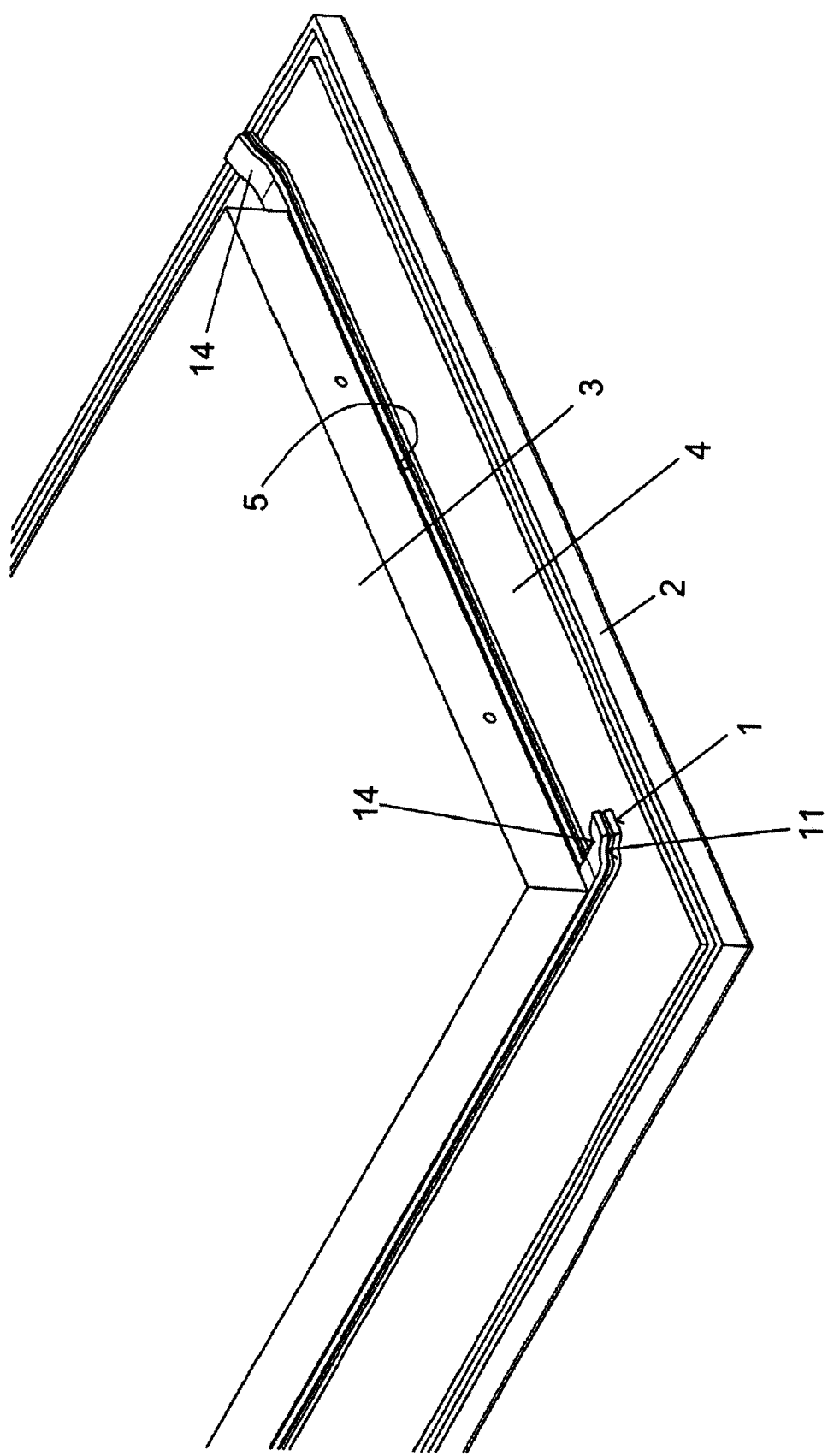
FIG. 2 shows a sample application for the arrangement of the fabric in accordance with FIG. 1.

FIG. 2 additionally shows a specific application for the connection of the two components 2 and 3 configured in the form of a panel and a display. The fabrics 1 are arranged along the edges of the components 2 and 3. A holding lug 14 is attached to each of the fabrics 1, which projects beyond the panel 2 and display 3, and by means of which a tensile force 15 is applied to the particular fabric 1. The holding lug 14 can be gripped by hand or using tools. As soon as sufficient tensile force 15 has been applied using the holding lug 14, preferably in the transverse direction of the fabric 1, the internal connection of the fabric in the area of the foam surfaces is destroyed, as a result of which the connection between the components is released. There is no adhesively effective material in the destroyed foam layers, as a result of which no new adhesive connections can be formed.

Figure 3:
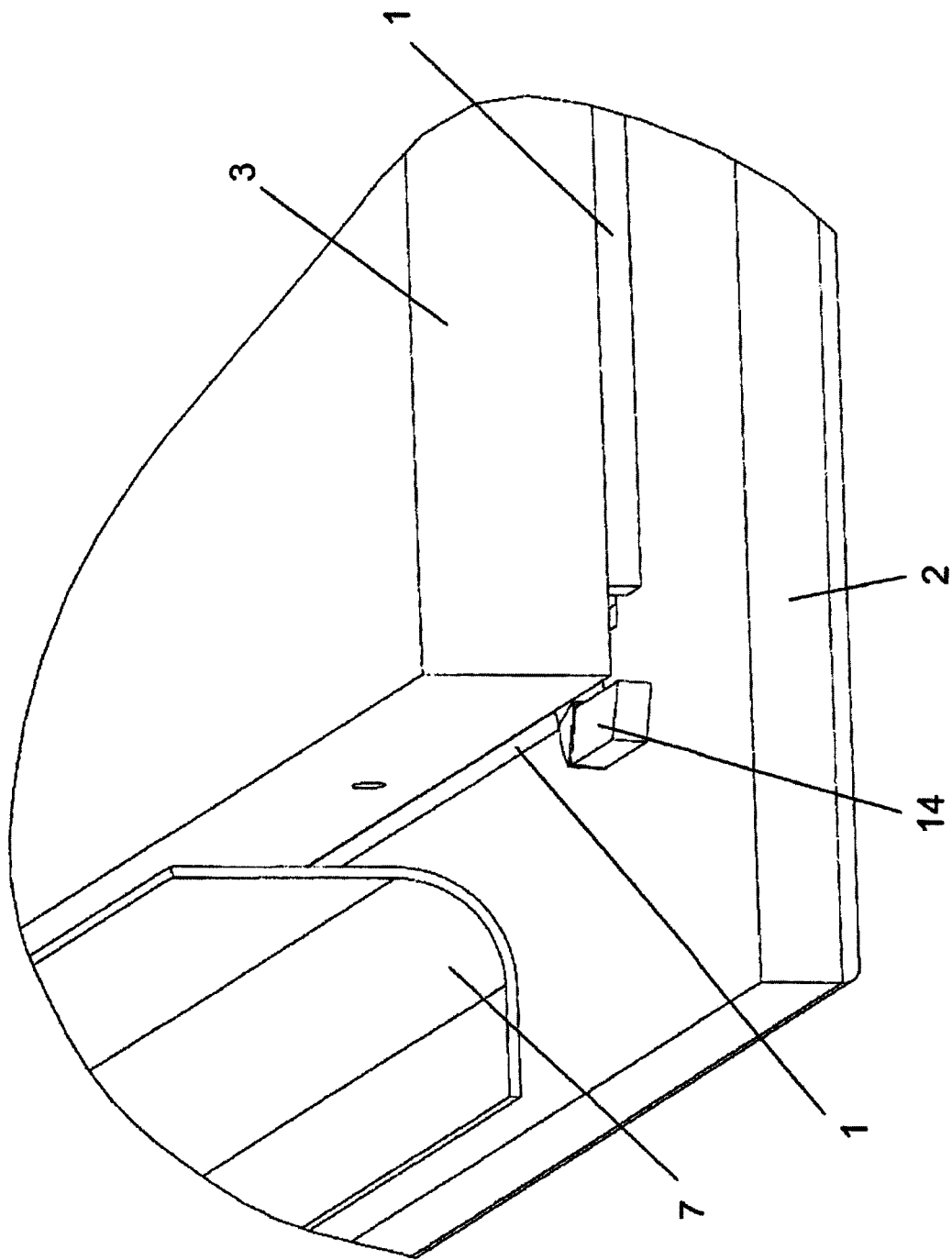
FIG. 3 shows the fabric in accordance with FIG. 2 at the beginning of the releasing movement.

FIG. 3 shows the fabric 1 at the start of the releasing movement. In this case, the fabric 1 can be pulled out at the holding lug 14, initially in any direction sideways between the components 2 and 3.

Figure 4:
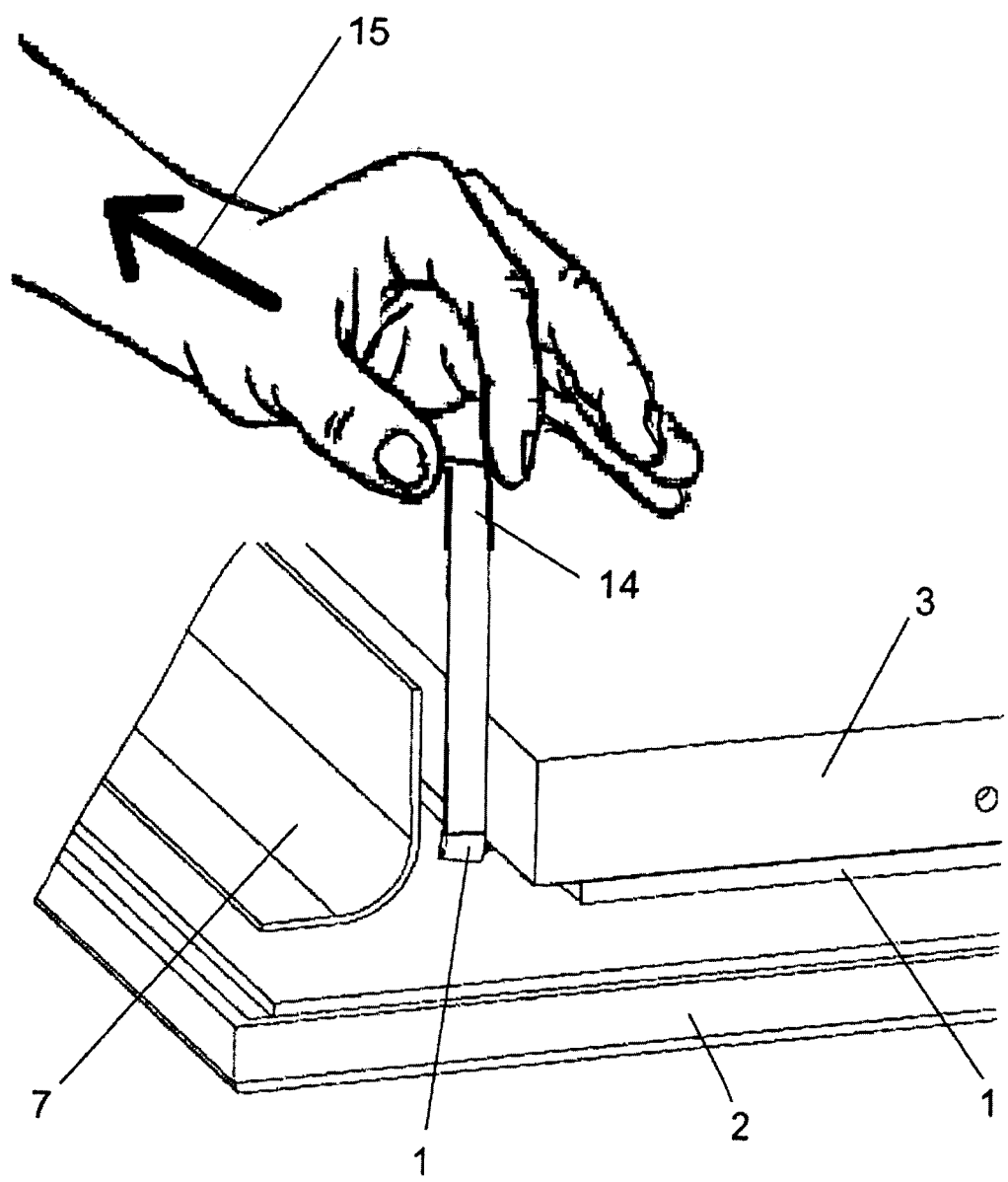
FIG. 4 shows the fabric in accordance with FIG. 2 during the releasing movement, in the direct vicinity of adjacent components.

FIG. 4 shows the fabric 1 during the release movements. The movement is performed transversely, or at right angles, to the adhesive surfaces. The adhesive forces between the fabric 1, or against the components 2 and 3, are greater than the internal cohesion of the foam layer 13, as a result of which the fabric 1 is destroyed within the foam structure in the foam layer 13. This release movement can also take place in the direct vicinity of adjacent components 2, 3, or an adjacent component 7.

Figure 5:
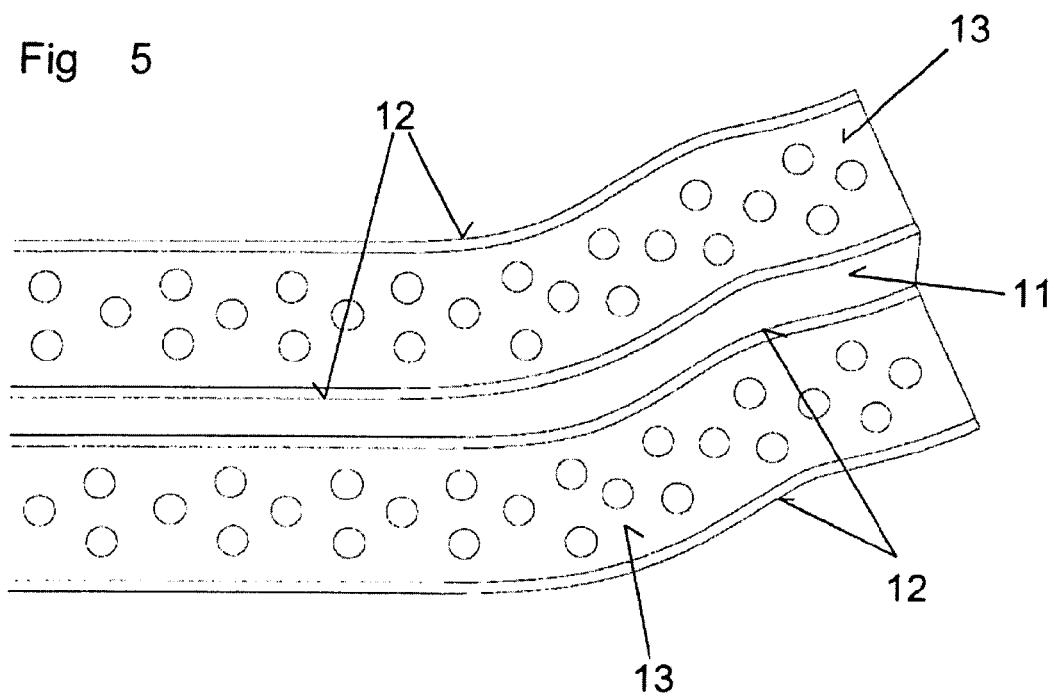
FIG. 5 shows the fabric in accordance with FIG. 1 in which the corresponding foam layer is of PE foam, with each layer possessing two adhesive surfaces of acrylic, with a PET separating foil in the middle.

FIG. 5 shows the fabric 1 with a seven-layered structure. The adhesive layers 12 in this case consist of an acrylic adhesive layer, the particular foam layer 13 consists of a PE foam. Furthermore, the fabric has a PET separating foil 11 in the middle between these adhesive layers 12, which has a particularly high tear resistance.

Figure 6:
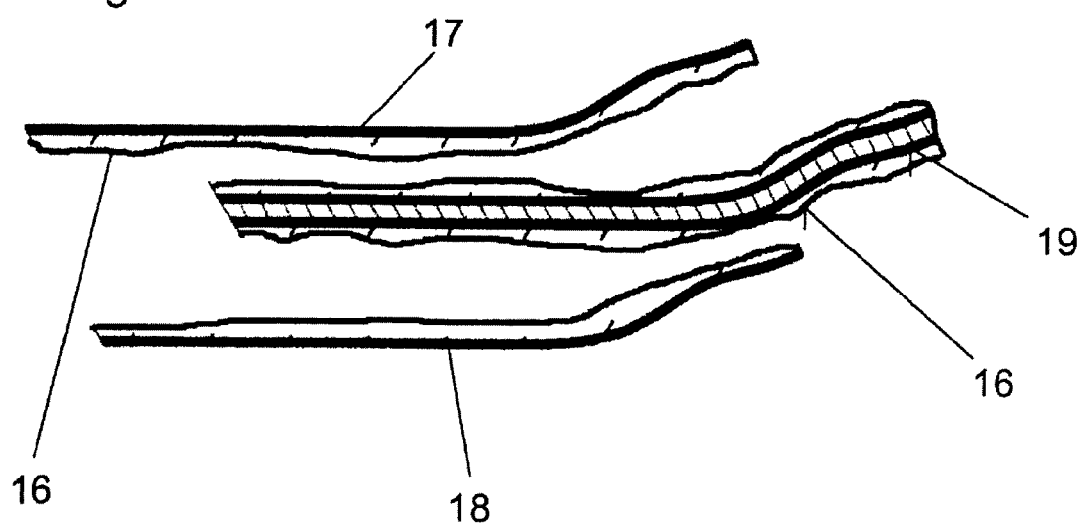
FIG. 6 shows the fabric in accordance with FIG. 1 after it has been destroyed by the application of a tensile force in order to release the adhesive connection in the foam layer.

FIG. 6 shows the fabric after it has been destroyed by application of a tensile force in order to release the adhesive connection in the foam layer 2. In this case, a remainder 17 of the fabric 1 remains on the component 3 and a remainder 18 of the fabric 1 remains on the component 2. A remainder 19 of the fabric 1 largely consists of the separating foil 11, and is separated out from between the components 2, 3 in this process. A remainder 16 of adhesive layers 12 remains disposed on one or both of remainders 17, 18 and/or remainder 19.

The invention claimed is:

1. A fabric for releasably attaching a first component to a second component, the fabric comprising:

a first foam layer comprising an inner surface and an outer surface, said outer surface of said first foam layer comprising an adhesive for adhering said first foam layer to the first component;

a second foam layer comprising an inner surface and an outer surface, said outer surface of said second foam layer comprising an adhesive for adhering said second foam layer to the second component;

a separating foil layer comprising a first surface and a second surface;

an adhesive disposed between said inner surface of said first foam layer and said first surface of said separating foil layer for adhering said first foam layer to said separating foil layer; and an adhesive disposed between said inner surface of said second foam layer and said second surface of said separating foil layer for adhering said second foam layer to said separating foil layer;

wherein the holding strength of said adhesive disposed between (i) said first foam layer and the first component, (ii) said second foam layer and the second component, (iii) said first foam layer and said first surface of said separating foil layer, and (iv) said second foam layer and said second surface of said separating foil layer exceeds the structural integrity of said first foam layer and the structural integrity of said second foam layer;

such that when the first component is pulled from the second component in a transverse direction, (i) said first foam layer ruptures intermediate the inner surface and the outer surface of said first foam layer, and (ii) said second foam layer ruptures intermediate the inner surface and the outer surface of said second foam layer.

2. The fabric in accordance with claim 1 wherein a distribution of adhesive forces is provided in the fabric, with a defined adhesive strength against the first component and the second component or against said separating foil layer.

3. The fabric in accordance with claim 1 wherein said first foam layer and said second foam layer comprise polyethylene foam coated with acrylate on both sides thereof, such that said acrylate comprises said adhesive, and said separating foil layer comprises polyethylene terephthalate.

4. The fabric in accordance with claim 1 wherein the fabric comprises a holding lug which projects beyond the edge of the first component and the second component which are to be connected together, and wherein said holding lug is aligned in the longitudinal direction of said fabric.

5. The fabric in accordance with claim 1 wherein the first component comprises a glass or plastic display, and the second component comprises a glass or plastic panel, wherein said fabric is releasable from said panel and said display by applying a tensile force, and when said fabric is pulled by said tensile force, the fabric tears apart intermediate at least one of said first foam layer and said second foam layer as a result of the tensile force being applied, in order to release said display from said panel.

6. The fabric in accordance with claim 1 wherein adhesive forces in said fabric or towards the first and second components are greater than the internal cohesion of said first foam layer and said second foam layer.

\* \* \* \* \*